(12) United States Patent
Niehoff

(10) Patent No.: US 6,378,904 B1
(45) Date of Patent: Apr. 30, 2002

(54) ATV TRAILER

(76) Inventor: James Patrick Niehoff, 5355 Audobon Ave., Inver Grove Heights, MN (US) 55077

(*) Notice: Subject to any disclaimer, the term of this patent is extended or adjusted under 35 U.S.C. 154(b) by 0 days.

(21) Appl. No.: 09/756,049

(22) Filed: Jan. 8, 2001

(51) Int. Cl.$^7$ ............................................. B62D 63/06
(52) U.S. Cl. ................ 280/789; 280/768; 296/181; D12/101
(58) Field of Search ................................ 280/400, 789, 280/768; 296/181, 182; D12/101, 105, 106

(56) References Cited

U.S. PATENT DOCUMENTS

| | | | |
|---|---|---|---|
| D151,240 S | * 10/1948 | Inskeep | D12/105 |
| 3,888,532 A | * 6/1975 | Link | 293/62 |
| 5,082,307 A | * 1/1992 | Hollingworth, Jr. | 280/699 |
| 5,513,868 A | * 5/1996 | Barr | 280/400 |
| 5,538,615 A | * 7/1996 | Dixon | 296/180.4 |
| D376,564 S | * 12/1996 | Mishoe | D12/101 |
| 5,609,350 A | * 3/1997 | Chumlet et al. | 280/476.1 |
| 6,231,030 B1 | * 5/2001 | Smith | 254/324 |

FOREIGN PATENT DOCUMENTS

| | | |
|---|---|---|
| DE | 3627284 A1 | * 3/1987 |
| GB | 2250005 A | * 5/1992 |

* cited by examiner

Primary Examiner—Brian L. Johnson
Assistant Examiner—Daniel Yeagley
(74) Attorney, Agent, or Firm—Thomas B. Tate

(57) ABSTRACT

A trailer which is hitched to an all-terrain vehicle (ATV) to haul cargo. The trailer has a frame of steel tubing, triangular cross bar wings which serve as tree deflectors, a floor bolted down by gussets, a heavy duty axle, large tires, fenders, a long tailgate, and corner angles at the tongue to frame connection.

1 Claim, 4 Drawing Sheets

ATV TRAILER

BACKGROUND OF THE INVENTION

The field of the invention is ATV trailers.

Hunters and other outdoor sportsmen frequently use all-terrain vehicles (ATV's) to travel into areas not accessible by other means of transportation (e.g., heavily forested, boggy, or rocky areas). Trailers to be pulled behind ATV's need to be capable of operating in such terrain, and it is desirable that ATV trailers be capable of hauling heavy cargo such as the carcasses of large game animals.

Several ATV trailers are known in the prior art. U.S. Pat. No. 5,645,292 to McWilliams et al. discloses an ATV trailer made from tubing, However, its structure is otherwise different from the present invention; McWilliams et al. has a tiltable V-shaped load bed and a light weight rather than heavy duty axle. U.S. Pat. No. Des. 376,564 to Mishoe has a long tailgate and has fenders but is otherwise an open framework rather than the enclosed structure found in the present invention. U.S. Pat. No. 5,222,753 to Parish shows an ATV trailer which has a support platform and divider wall and has little or no structure in common with the present invention. No prior art has been found which alone or in combination shows the combination of features found in the present invention.

SUMMARY OF THE INVENTION

The invention is an ATV trailer which has a frame of steel tubing, triangular cross bar wings which serve as tree deflectors, a floor bolted down by gussets, a heavy duty axle, large tires, fenders a long tailgate, and corner angles at the tongue to frame connection.

An object of the invention is to provide an ATV trailer which is strong enough that it can be used to haul any type of cargo.

Another object of the invention is to provide an ATV trailer which is capable of operating in all types of terrain.

DETAILED DESCRIPTION OF THE INVENTION

Figure 1:
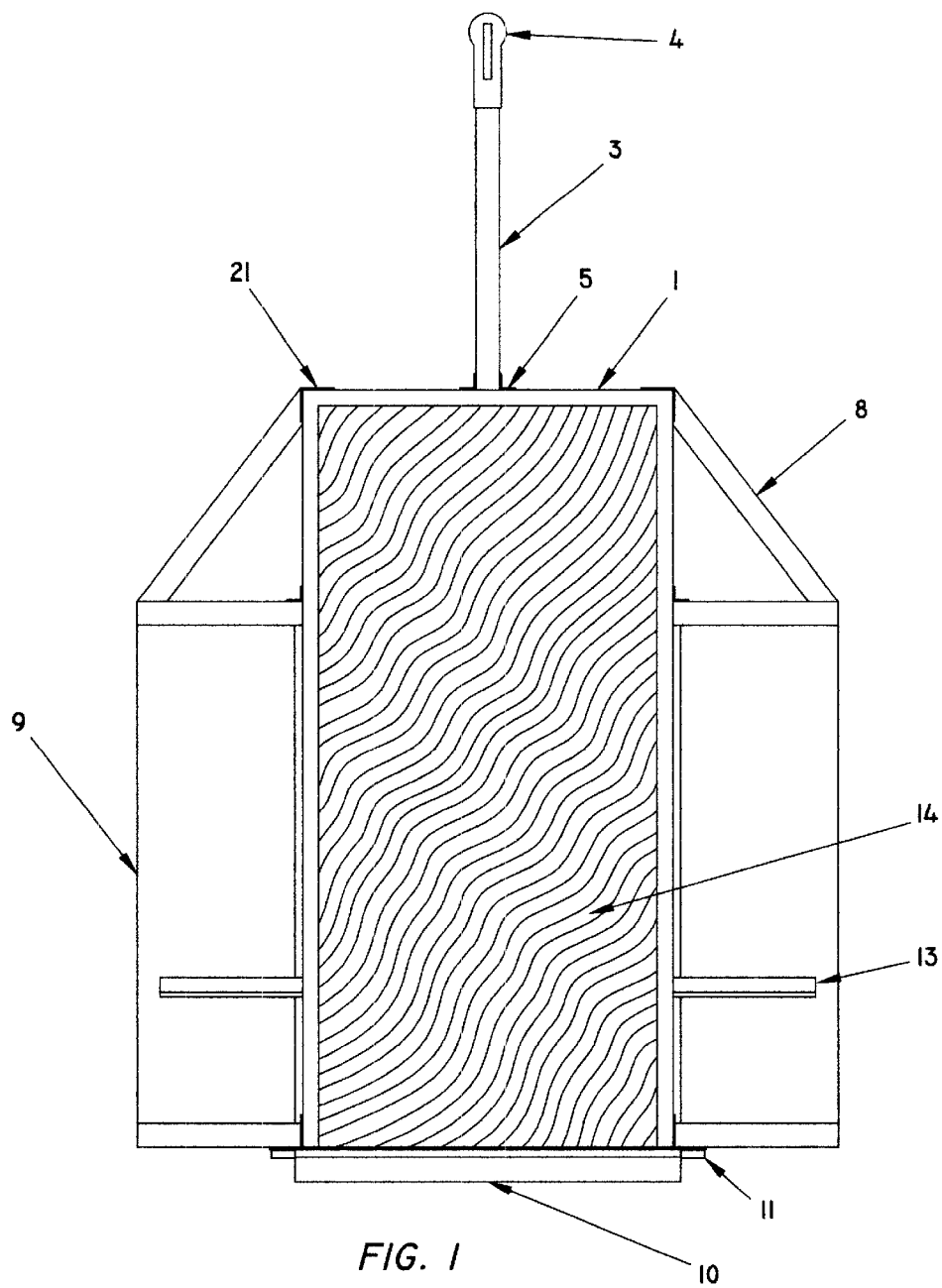
FIG. 1 is a top view.
Figure 2:
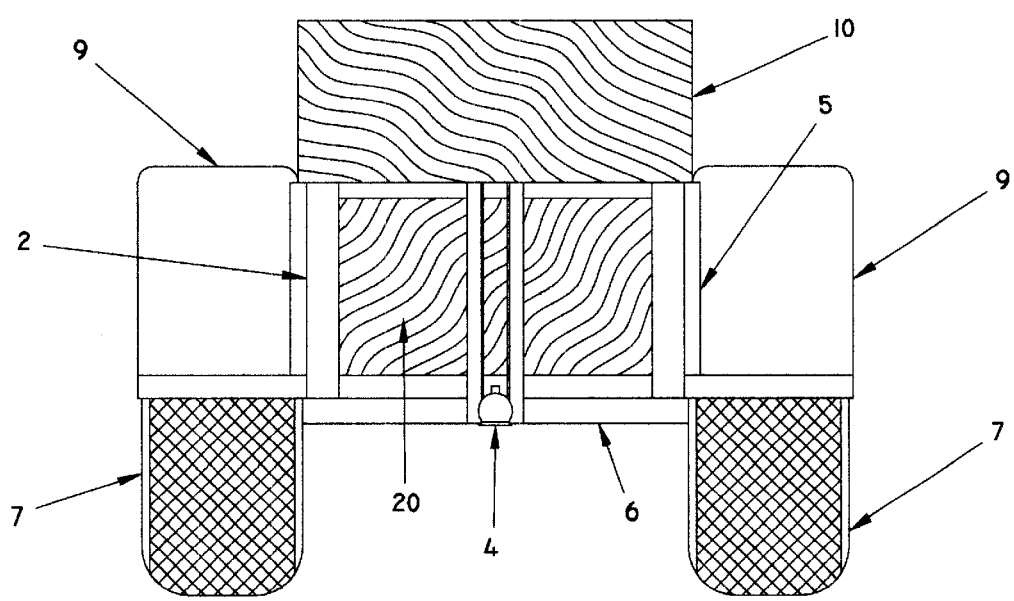
FIG. 2 is a front view.
Figure 3:
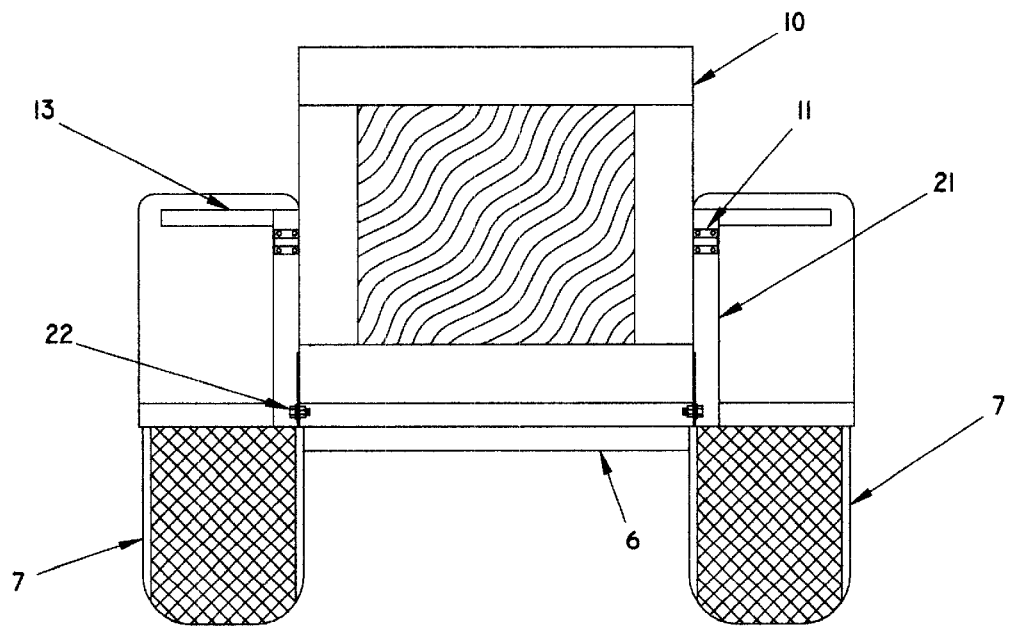
FIG. 3 is a rear view.
Figure 4:
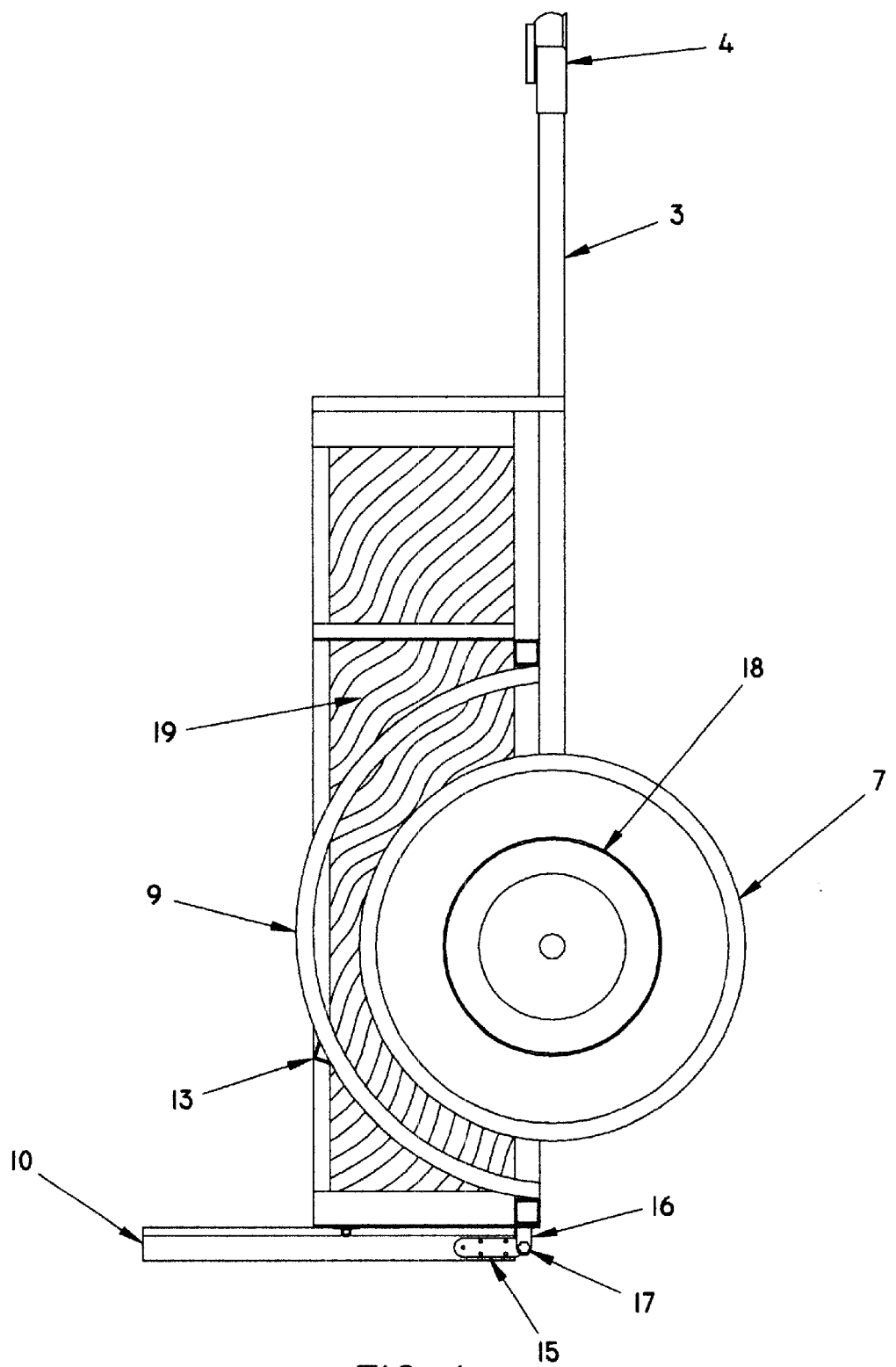
FIG. 4 is a side view.
Figure 5:
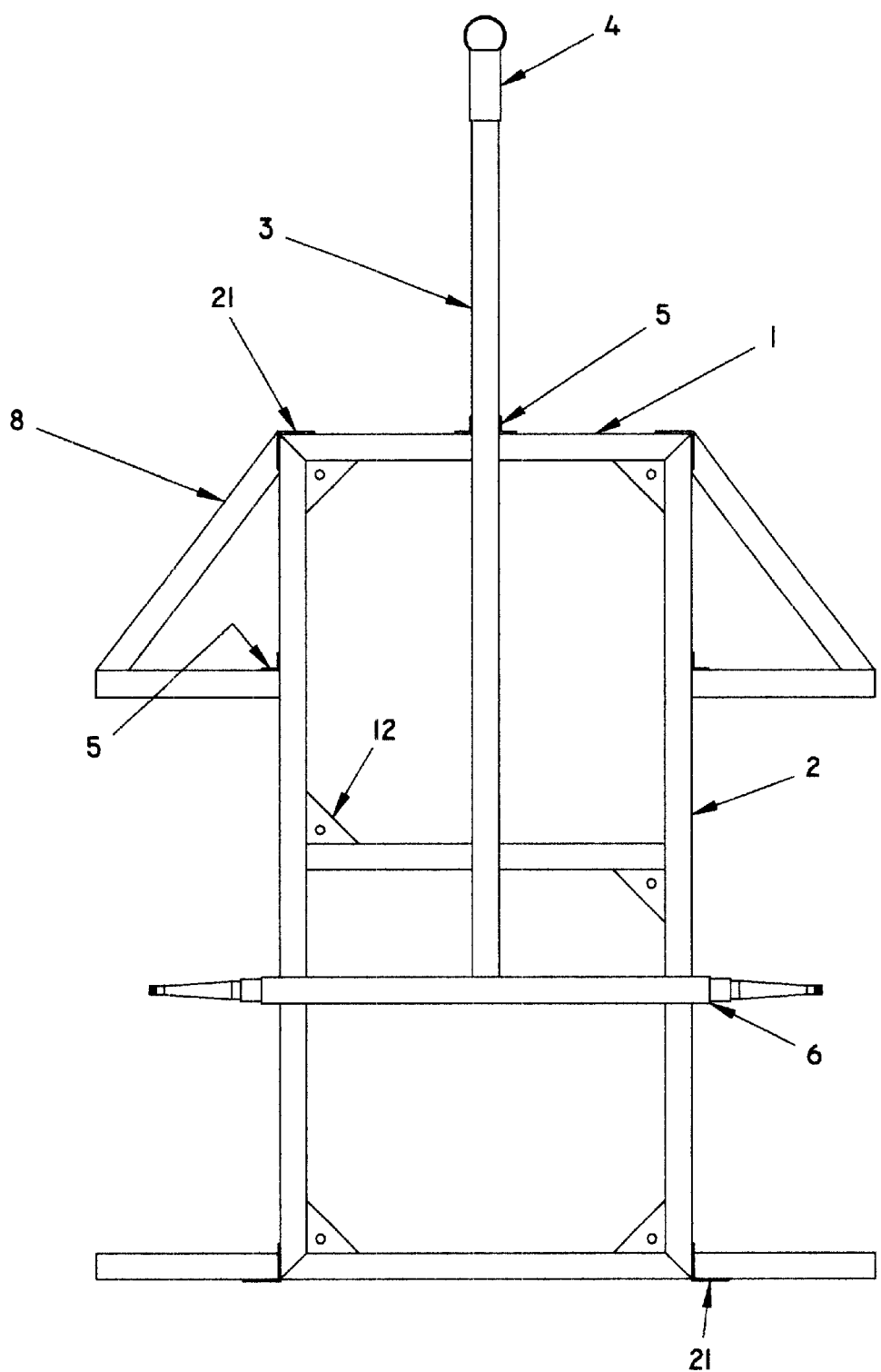
FIG. 5 is a bottom view.

The ATV trailer has a framework wherein all frame members are square tubing, one and one-half inches long on each side and made of steel. The frame members are connected (welded) to each other to form the bottom, sides, front, and back of the trailer. Each of these has at least two parallel horizontal frame members 1 and at least two parallel vertical frame members 2. The drawings show the preferred configuration, wherein the bottom has four horizontal and three vertical members, the sides each have two horizontal and three vertical members, the front has two horizontal and four vertical members, and the back has two horizontal and two vertical members. The center vertical frame member on the bottom extends forwardly to form a tongue 3 which attaches to the ATV by conventional hitching means such as a ball hitch 4. Two angles 5 are welded onto the frame to strengthen the tongue to frame connection.

The third horizontal frame member (counting from the front) on the bottom has a heavy duty axle 6 (preferably a one ton stub axle) welded into it. The axle 6 is stronger than necessary for carrying anticipated loads in order to allow the trailer to be driven over stumps and rocks without breaking down. Large tires 7 are mounted at either end of the axle 6. The tires 7 are of the same size and type as ATV tires in order to provide flotation and allow the trailer to be pulled through muddy or boggy areas. The trailer follows directly behind the ATV in the tracks that the ATV makes.

A pair of triangular cross bar wings 8 serve as tree deflectors in order to allow the trailer to pass freely between trees in the forest. The wings 8 are connected on either side of the trailer to the bottom side frame at the corners with the bottom front member. Each wing 8 is formed as a right triangle wherein the vertical side is the bottom side frame member, the diagonal side extends outwardly and rearwardly from the apex of the triangle formed by the corner of the bottom side frame member and the bottom front frame member, and the horizontal side connects from the bottom side frame member (which is the vertical side of the triangle) to the end of the diagonal side of the triangle which is distal to the apex of the triangle.

A fender 9 is attached to the horizontal side of each triangular wing 8 and extends upwardly, rearwardly, and then downwardly (in a generally arcuate shape) in spaced relation above the tire 7 on its respective side of the trailer. Each fender 9 is also attached by means of a fender support 13 to the top side frame member on its side of the trailer. The fenders 9 prevent mud from splashing onto the drivers of the ATV, and also deflect trees to prevent branches from getting caught between the wheels 18 and the frame.

The front, sides, back, and bottom of the trailer are enclosed by sheets of pressure treated plywood which are attached to the frame members. The top of the trailer is open to allow easy loading and unloading of cargo. On the front and sides of the frame, the plywood forms front panels 20 and side panels 19 which are held in place by angles 21 which also add strength to the corners. The back forms a tailgate 10 which is long enough to reach the ground and thereby provide a ramp for loading and unloading of cargo. The plywood on the back is connected to the frame members by a pair of basps 11 and by a hinge 22 which is formed by a lug 16 welded onto the frame and having a bolt 17 disposed through the lug 16 to serve as a hinge point, the hinge 22 also being formed by a bracket 15 which is screwed into the wood frame of the tailgate 10. On the bottom, the plywood forms a floor 14 which is bolted to the frame by means of gussets 12 which serve as corner stiffeners to make the floor 14 watertight and thus prevent rusting of the frame.

I claim:

1. A trailer which is adapted to be pulled behind an all-terrain vehicle (ATV), said trailer comprising:

a plurality of frame members comprised of square tubing, said frame members being connected to each other to form the bottom, sides, front, and back of said trailer, such that said bottom, sides, front, and back of said trailer each include at least two parallel vertical members;

said bottom frame members including a tongue attachable to said ATV by hitch means, and a heavy duty axle upon which tires are mounted, said tires being of similar size and type to the tires on said ATV;

said back frame members forming a tailgate of sufficient length to be used as a ramp;

wing-like tree deflectors mounted on either side of said frame, each of said deflectors being comprised of frame members forming a right triangle with the bottom-most front frame member and the bottom-most side frame member such that an apex of said right triangle joins the corner formed by said bottom-most front frame member and said bottom-most side frame member, said right triangle has its diagonal side projecting outwardly and rearwardly from said apex, has said bottom-most side frame member as its vertical side, and has a horizontal side extending perpendicularly outward from said vertical side to connect to the end of said diagonal side which is distal to said apex;

a fender attached to said horizontal side of each of said deflectors, and curving upwardly, then rearwardly, then downwardly above said tires;

angles for stiffening the corners where said bottom frame members join to said tree deflectors and where said bottom frame members join to said tongue;

a floor which is attached to said bottom frame members by means of gussets which serve as corner stiffeners.

* * * * *